April 25, 1950  G. R. EGO  2,505,609
DIRECT COUPLED AUTOMATIC RELEASE TRACTOR PLOW
Filed Sept. 24, 1945  3 Sheets-Sheet 3
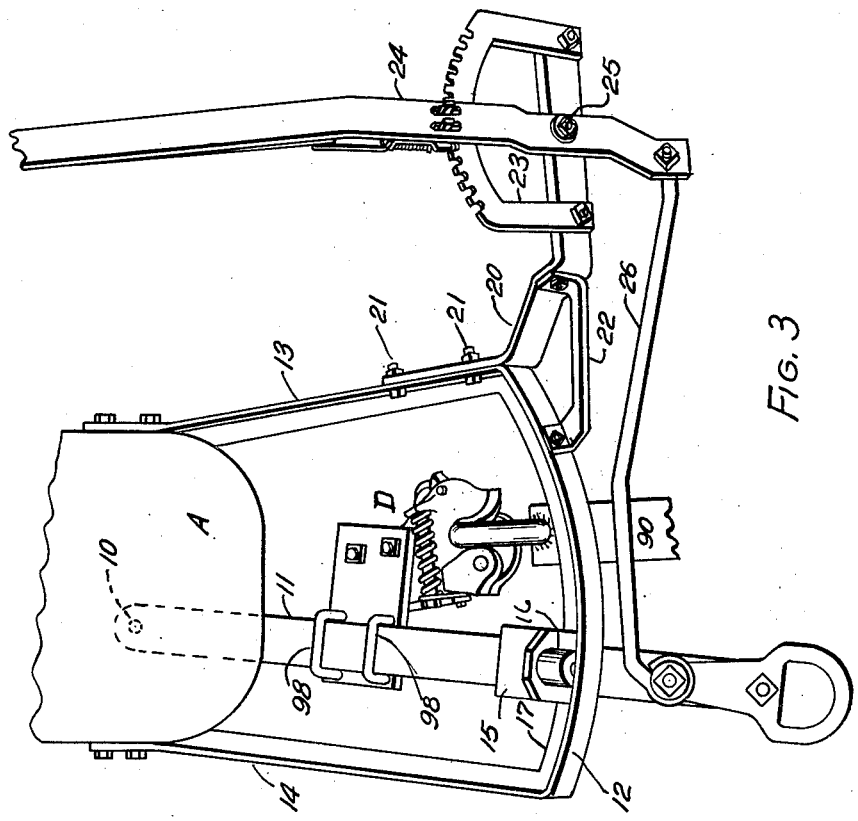
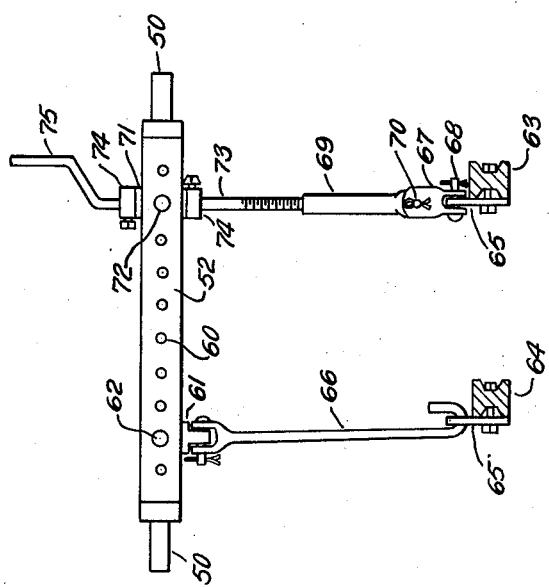
INVENTOR.
GEORGE R. EGO
BY
ATTORNEY Patented Apr. 25, 1950

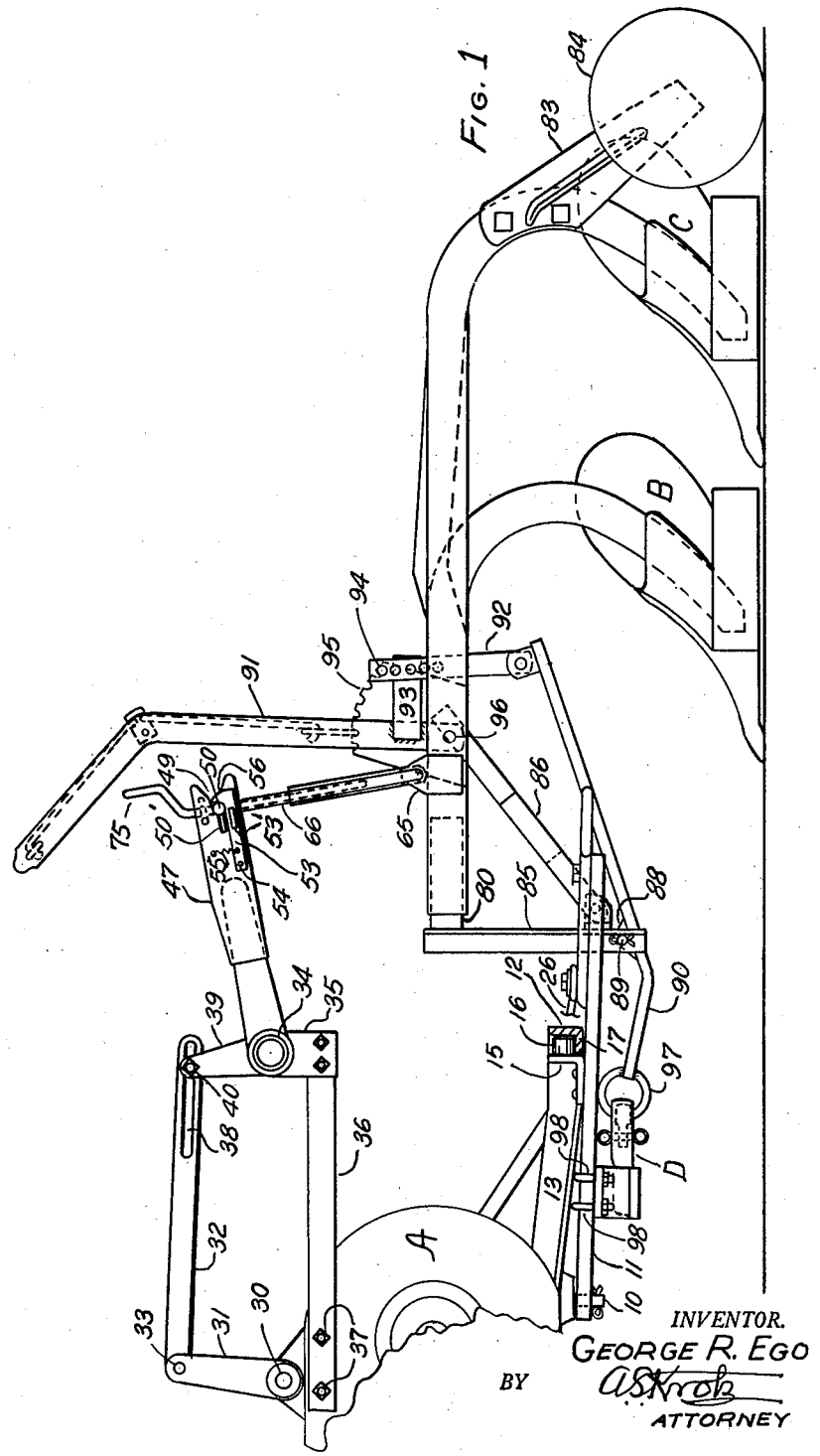

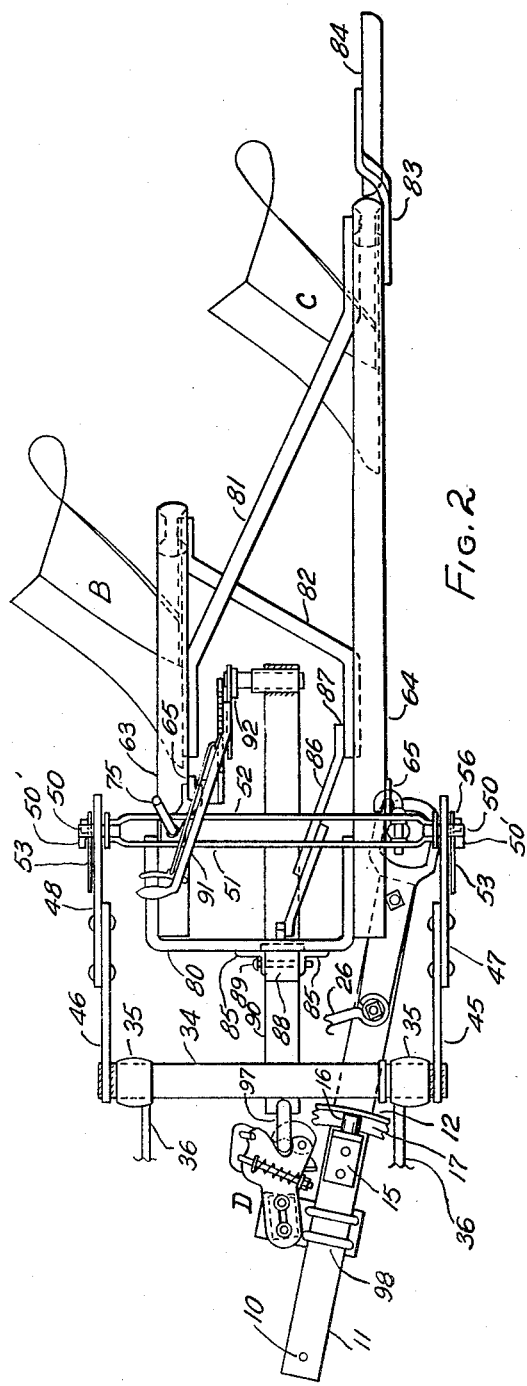

2,505,609

UNITED STATES PATENT OFFICE 2,505,609

DIRECT-COUPLED AUTOMATIC RELEASE TRACTOR PLOW

George Ross Ego, Brantford, Ontario, Canada, assignor to Massey-Harris Co. Ltd., Brantford, Ontario, Canada, a corporation of Canada Application September 24, 1945, Serial No. 618,158

7 Claims. (Cl. 97—50)

The present invention relates to a direct coupled plow having means whereby, when the plow meets a serious obstruction, all of its connections to the tractor will be automatically released.

The principal object of the present invention is to provide a direct coupled plow which is simple, easily manufactured at low cost, easily attached and detached from the tractor and having means for complete control of the plow by the driver from the tractor seat.

An object of the present invention is to hitch the tractor to the standard draw-bar by means of an automatic release and having a lever operating means for shifting the plow hitch transversely; and furthermore to provide a power lifting means having a manually operated means for tilting the plow and means for releasing these connections automatically when the plow hitch to the draw-bar has been released.

Another object of the present invention is to provide a plow hitch for the device which is hingedly secured to the front ends of the beams of the plow and somewhat below the beams to thereby provide a suitable draft line and to provide an adjustable connection between a rearwardly extending portion of the plow hitch member and the beams for regulating the height of the front end of the hitch relative to the plow, to thereby determine the depth plowed.

A further object of the present invention is to provide means whereby the plow hitch connection to the tractor draw-bar may be lever adjusted transversely relative to the tractor.

To these and other useful ends my invention consists of parts, combinations of parts or their equivalents and mode of operation as hereinafter described and claimed and shown in the accompanying drawings in which:

Fig. 1 is a side elevational view of my device as connected to a standard tractor, a fraction only of which is shown.

Fig. 2 is a top view of the device shown in Figure 1, some of the parts shown in Figure 1 being omitted.

Fig. 3 is a fractional view of a tractor illustrating the tractor draw-bar, its support and a lever carrying extension to the draw-bar support having a link connection to the tractor draw-bar and illustrating a fraction of the plow hitch and its automatic releasable connection to the tractor draw-bar.

Fig. 4 illustrates a rear view of the plow beam connections to the power lift arms.

As thus illustrated A designates the tractor having on its bottom near the rear end thereof a trunnion 10 to which the tractor draw-bar 11 is pivotally mounted. A tractor guideway 12 is positioned on a radius with trunnion 10 and having forwardly extending arms 13 and 14 which are secured in any suitable manner to the frame of the tractor. Draw-bar 11 is provided with a bracket 15 having a roller 16 rotatably mounted thereon. Member 12 is preferably an angle iron, the lower lip 17 of which extends freely between roller 16 and tractor draw-bar member 11; thus it will be seen that draw-bar 11 can swing sidewise on trunnion 10 as an axis.

I provide means for manually swinging the draw-bar sidewise as follows: A bracket 20 is secured to member 13 by means of bolts 21—21 and having preferably a brace 22. A notched sector 23 is secured to member 20 and a lever 24 is pivoted to member 20 as at 25. Lever 24 is provided with the usual latches which engage the notches in member 23 having a rod which extends to a hand piece on the upper end of the lever. These lever engaging and controlling means are too well known to require further illustration or description.

Lever 24 extends a distance below its pivot 25, the lower end of which is operatively connected to draw-bar 11 by means of a link 26, as clearly illustrated in Figure 3. The upper end of lever 24 is positioned within easy reach of the operator so the operator can conveniently move member 11 in either direction on its pivot and in turn move the plow hitch transversely relative to the tractor as will hereinafter appear.

Tractor A is provided with a power lift which is generally positioned within the frame of the tractor, the power lift having a shaft 30 which protrudes through the side of the tractor frame. A lever 31 is secured to shaft 30. A link 32 is pivoted to the upper end of member 31 as at 33. A tube or shaft 34 is rotatably mounted in brackets 35—35, these brackets being secured to opposite sides of the tractor by means of bars 36—36 preferably by means of bolts 37—37. Link 32 is provided with a slot 38 and shaft 34 has secured thereto a lever 39, the upper end of the lever having a bolt 40 which slidably extends through slot 38. Slot 38 is positioned and has a length whereby when the plow is in an operating position bolt 40 is a short distance in front of the rear end of the slot so the plow depth may be regulated independent of the power lift as will hereinafter appear.

The power lift connection between member 34 and the beams of the plow is as follows: Rearwardly extending arms 45 and 46 are at their front ends secured to member 34 having secured to their rear-ends plates 47 and 48. These plates at their rear ends have flared openings 49 for the free reception of pins 50—50, the pins being secured to the ends of spaced cross bar members 51 and 52. I provide hook latches 53—53 which are pivoted to members 47 and 48 as at 54—54. Springs 55—55 (see Figure 1) are adapted to hold latches 53 in the position shown in Figure 1, with pins 50 in front of hooks 56—56.

The device next above described is normally adapted to hold pin 50 in position in the bottom of openings 49, however the position of pivot 54 and shape of the fronts of hooks 56 are such that a considerable pull against pins 50 will permit these pins to move rearwardly out of openings 49, this event occurring as will hereinafter appear.

On the forward sides of members 50 and on the outside of members 47 and 48 I secure a plate 50' (see Figures 1 and 2). I secure a plate 53' to the outside of member 53 (see Figure 1). Members 53' lie close to members 50' so when the plow is released and the lower ends of members 66 and 69 assume a considerable angle, member 50' will contact 53' and assist in disengaging hook 56.

Members 51 and 52 have registering openings 60. A block 61 lies freely between members 51 and 52 and is held in pivotal hinged relation thereto by a bolt 62. The plow proper consists of beams 63 and 64, having secured thereto brackets 65—65. Member 65 on beam 64 is operatively connected to block 61 by means of a link 66 as illustrated in Figure 4, providing means for swinging the lower end of the link in either direction. Link 73 in its connection to bracket 65 may also swing in either direction.

Beam 63 is operatively connected to members 51 and 52 as follows: A bracket 67 is hingedly connected to member 65 as at 68. An elongated member 69 is screw-threaded for the greater part of its length and is longitudinally pivoted to member 67 as at 70. A block 71 is positioned between members 51 and 52 and hinged thereto by means of a bolt 72. A shaft 73 rotatably extends through member 71 and having secured thereto and on opposite sides of member 71, collars 74—74; thus member 69 may swing sidewise on pivot 72. The upper end of member 73 is provided with a crank 75 and member 73 is screw threaded into member 69; thus it will be seen that the plow is free to swing sidewise or forwardly and rearwardly relative to members 47 and 48 and that by turning crank 75 one way or the other the plow may be tilted relative to the tractor.

Beams 63 and 64 are secured together at their front ends by means of a cross brace 80 and at their rear ends by means of braces 81 and 82, the beams being conventional and having secured at their lower ends plow bottoms B and C. At the rear end of beam 64 I secure a bracket 83, on the rear end of which is rotatably mounted a furrow wheel 84. This wheel and its purpose is too well known to require detail illustration and description. Suffice it to say that it cooperates with the plow hitch to control the depth plowed. This wheel may also be positioned at an angle so it runs in the corner of the furrow and takes some of the side thrust of the plow bottoms.

I mount transversely spaced angle bars 85—85 at their upper ends to member 80. From the lower ends of these bars a brace 86 extends upwardly and rearwardly and is secured to a beam, preferably 64 as at 87. A block 88 is pivoted between members 85 by means of a bolt 89. This block is rigidly secured to the plow hitch 90 about in the position shown in Figures 1 and 2. The rear end of this hitch has an operating connection to a lever 91 by means of a link 92 and a bell crank 93, the upper end of member 92 having a series of holes 94 for adjustment in its connection to member 93. A sector 95 is preferably secured to beam 63 to which lever 91 is pivoted as at 96, lever 91 having a latch for engaging the teeth in sector 95 and a hand piece at its upper end with a rod connection to the latch. The upper end of the lever is positioned within reach of the operator so the front end of plow hitch 90 can be raised or lowered relative to pivot 89 by means of this lever. The front end of plow hitch 90 has a link 97 for connection to an automatic release device which in its entirety is designated by reference character D. Member D is secured to member 11 preferably by U bolts 98—98 about as illustrated in Figure 2. Hitch D is too well known to require further description or illustration.

Thus it will be seen that because of members 12 and 17 the vertical position of member D remains constant relative to the tractor; therefore by moving lever 91 one way or the other the depth plowed by bottoms B may be regulated because of the cooperation of wheel 84, and that the level of the furrows may be maintained by turning crank 75 one way or the other. Furthermore by manipulating lever 24, hitch 90 may be moved transversely of the tractor. Therefore the two levers and crank 75 give the operator complete control over the plow.

I will now describe the operation of my device; when the power lift is operated to lift the plow, the front ends of the beams are first lifted because of links 66 and 73, the lifting operation continuing until the rear end of the plow is lifted clear of the ground. Clearly after the plows are lowered the depth plowed is controlled by lever 91 and the angle of the furrows plowed is controlled by crank 75; furthermore because of slot 38 the power lift has no control over the plows while in an operating position.

A novel feature of applicant's device is the connection of the plow hitch to the tractor drawbar. By scrutinizing the figures it will be seen that when the plow is detached the tractor drawbar may be swung sidewise by lever 24 to accommodate other implements.

I will now describe the operation of my releasing means and manner of reconnecting the plow to the tractor after it has been released. When the plow strikes a serious obstruction member D will be automatically disengaged from member 97, the plow will stop and as the tractor moves forward pins 50 will be pulled out of engagement or out of openings 49. To reengage the plow all that is necessary is to swing members 51 and 52 rearwardly and back the tractor so member D may be reattached to member 97 after which members 51 and 52 are moved forward so members 50 move into pocket 49 and over hook 56 which readily yields to pressure because of springs 55; thus reattaching the plow to the tractor is a matter of but a moment.

It will be understood that I have shown the preferred embodiment of my invention; that many changes in detail may be made without departing from the spirit and scope of the invention as recited in the appended claims.

Having thus shown and described my invention I claim:

1. In combination with a tractor having a power lift and a plow; a draw-bar hingedly mounted at its front end to the tractor, a guide frame for said draw-bar secured to the tractor and adapted to permit a transverse swinging movement of the draw-bar, manually operated means associated with the tractor for moving the draw-bar transversely, a plow hitch bar transversely hingedly connected intermediate its ends to the front end of the plow, an automatic release secured to said tractor draw-bar near the front end thereof and being adapted to releasably receive the front end of said plow hitch bar, the rear end of said plow hitch bar having a connection to a manually operated device mounted on the plow whereby the front end of the plow hitch bar may be raised and lowered relative to the plow, said power lift having rearwardly extending transversely spaced arms each having at their rear ends releasable connections to opposite sides of said plow for raising and lowering the plow, and whereby when said automatic hitch is released and the plow leaves the tractor said power lift connections to the plow will be released.

2. A device as recited in claim 1 including; one of said releasable connections having manually adjustable means for regulating its length to thereby determine the level of the plow.

3. A device as recited in claim 1 including; a furrow wheel mounted on the rear end of said plow and adapted to cooperate with said hitch bar to control the depth plowed.

4. In combination with a tractor having a power lift and a plow; a draw-bar hingedly mounted at its front end to the tractor, a guide frame for said draw-bar secured to the tractor and adapted to permit a transverse swinging movement of the draw-bar, a plow hitch bar transversely hingedly connected to the front end of the plow, a manually operated device mounted on the plow adapted to raise and lower the front end of said plow hitch bar relative to the plow, manually operated means associated with the tractor adapted to move the draw-bar transversely, an automatic release device secured to said tractor draw-bar near the front end thereof and adapted to releasably receive the front end of said plow hitch bar, said power lift having separate link connections to opposite sides of the plow, and releasable connections therebetween, whereby when said automatic connection is released said lower lift connections will also be automatically released.

5. A device as recited in claim 4 including; one of said link connections having means for manually adjusting its length for controlling the transverse level of the plow.

6. A device as recited in claim 4 including; a furrow wheel mounted on the rear end of said plow and adapted to cooperate with said first manually operated device to assist in regulating the depth plowed.

7. In combination with a tractor having a power lift, a plow, a draw bar hingedly mounted at its front end to the tractor, a guide frame secured to the tractor and adapted to permit a transverse swinging movement of the rear end of the draw bar, manually operated means mounted on the tractor operatively connected to said draw bar for the swinging movement thereof, a plow hitch bar transversely hingedly connected intermediate its ends to the front end of the plow, hitching means secured to said tractor draw bar intermediate the ends thereof, the rear end of said plow hitch bar having a connection to a manually operated device mounted on the plow, whereby the front end of the plow hitch bar may be raised and lowered relative to the plow, said power lift having rearwardly extending transversely spaced arms having at their rear ends a connection to its adjacent side of the plow for raising and lowering the plow, one of said rearwardly extending member connections to the plow having manually adjustable means for regulating its length to thereby determine the level of the plow relative to the tractor.

GEORGE ROSS EGO.

REFERENCES CITED

The following references are of record in the file of this patent:

UNITED STATES PATENTS

| Number | Name | Date |
| --- | --- | --- |
| 1,243,019 | Waterman | Oct. 16, 1917 |
| 2,184,422 | Graham | Dec. 26, 1939 |
| 2,217,900 | Graham | Oct. 15, 1940 |
| 2,319,670 | Ego | May 18, 1943 |
| 2,368,266 | Silver | Jan. 30, 1945 |

FOREIGN PATENTS

| Number | Country | Date |
| --- | --- | --- |
| 192,556 | Great Britain | Feb. 8, 1923 |
| 651,742 | France | Oct. 15, 1928 |